Nov. 22, 1938.　　　　W. R. HETLER　　　　2,137,611
GAUGE CONTROL APPARATUS
Filed Oct. 20, 1933　　　2 Sheets-Sheet 1
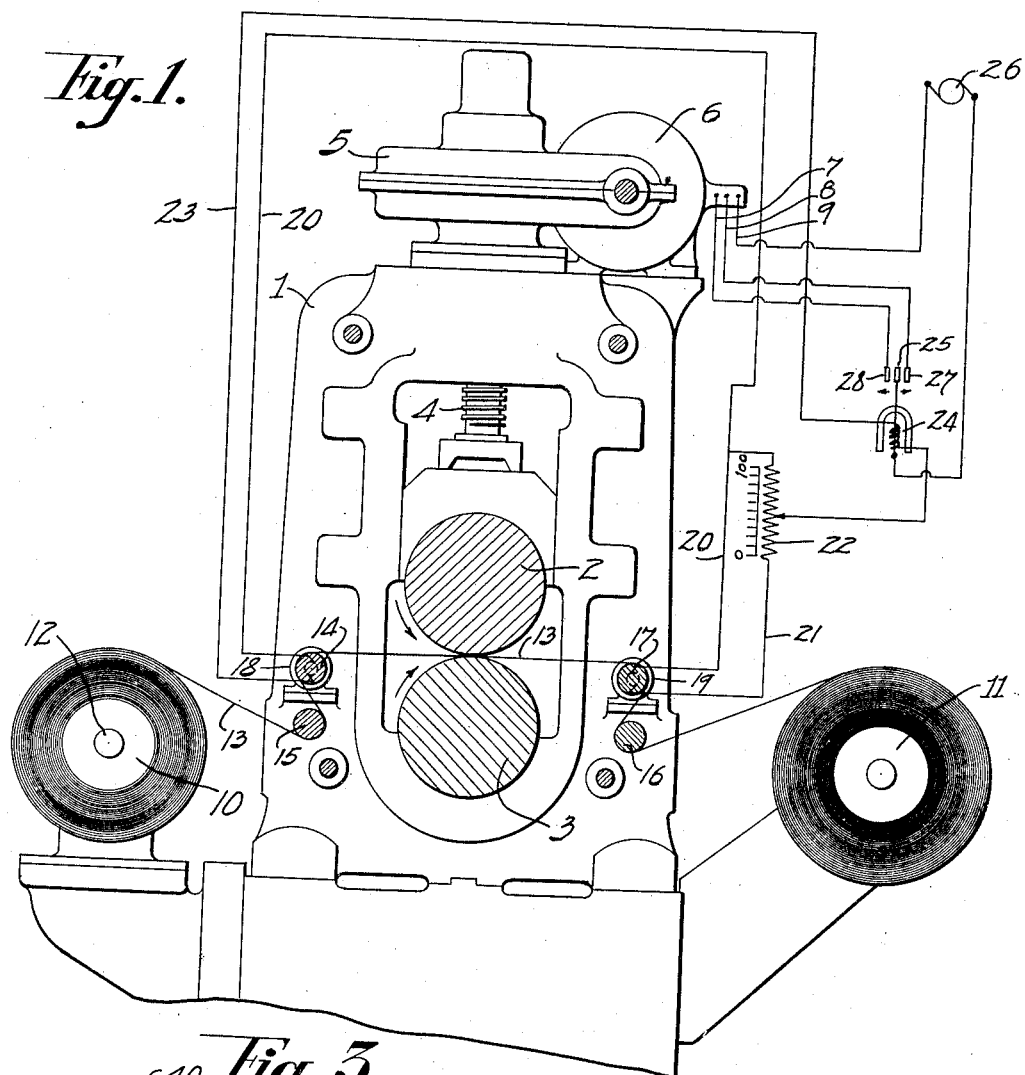
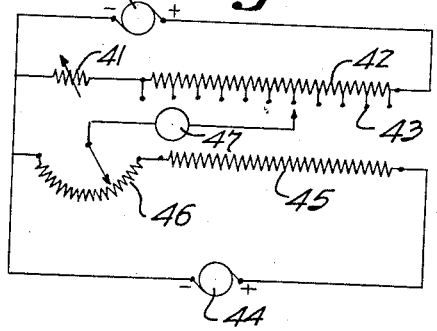
INVENTOR
Willard R. Hetler
BY
ATTORNEY Nov. 22, 1938.  W. R. HETLER  2,137,611
GAUGE CONTROL APPARATUS
Filed Oct. 20, 1933  2 Sheets-Sheet 2

INVENTOR
Willard R. Hetler
BY
ATTORNEY

Patented Nov. 22, 1938

2,137,611

UNITED STATES PATENT OFFICE 2,137,611

GAUGE CONTROL APPARATUS

Willard R. Hetler, Edgewater, N. J., assignor to Aluminum Company of America, Pittsburgh, Pa., a corporation of Pennsylvania Application October 20, 1933, Serial No. 694,440

14 Claims. (Cl. 80—56)

This invention relates to the rolling of metals and particularly to the production by rolling processes of accurately gauged strip, thin foil and the like in comparatively long lengths, such as are usually most conveniently handled in coil form. More specifically the invention relates to apparatus for indicating deviation from gauge and correcting such deviation during the operation of rolling to produce a product having a high degree of uniformity of gauge throughout a given length.

The primary object of the invention is to provide apparatus suitable for producing a highly uniform product during the process of rolling, the apparatus being simple in construction, easy and inexpensive to install in connection with existing rolling equipment, and economical and dependable in operation.

Another object is to provide a control system for governing the operation of rolling mills, which system is adapted to automatically adjust the rolling conditions in a suitable manner to compensate for any tendency to deviate from gauge.

These and various other objects, as well as the novel features and advantages of the invention will be more apparent when the following detailed description is read in conjunction with the accompanying drawings in which:

Fig. 1 shows a section taken through a rolling mill of the usual form in which one form of gauge control device constructed according to my invention is illustrated;

Fig. 3 shows a simplified form of my invention adapted to be used in conjunction with a rolling mill to visually indicate deviation from gauge of the product being rolled.

Figure 2:
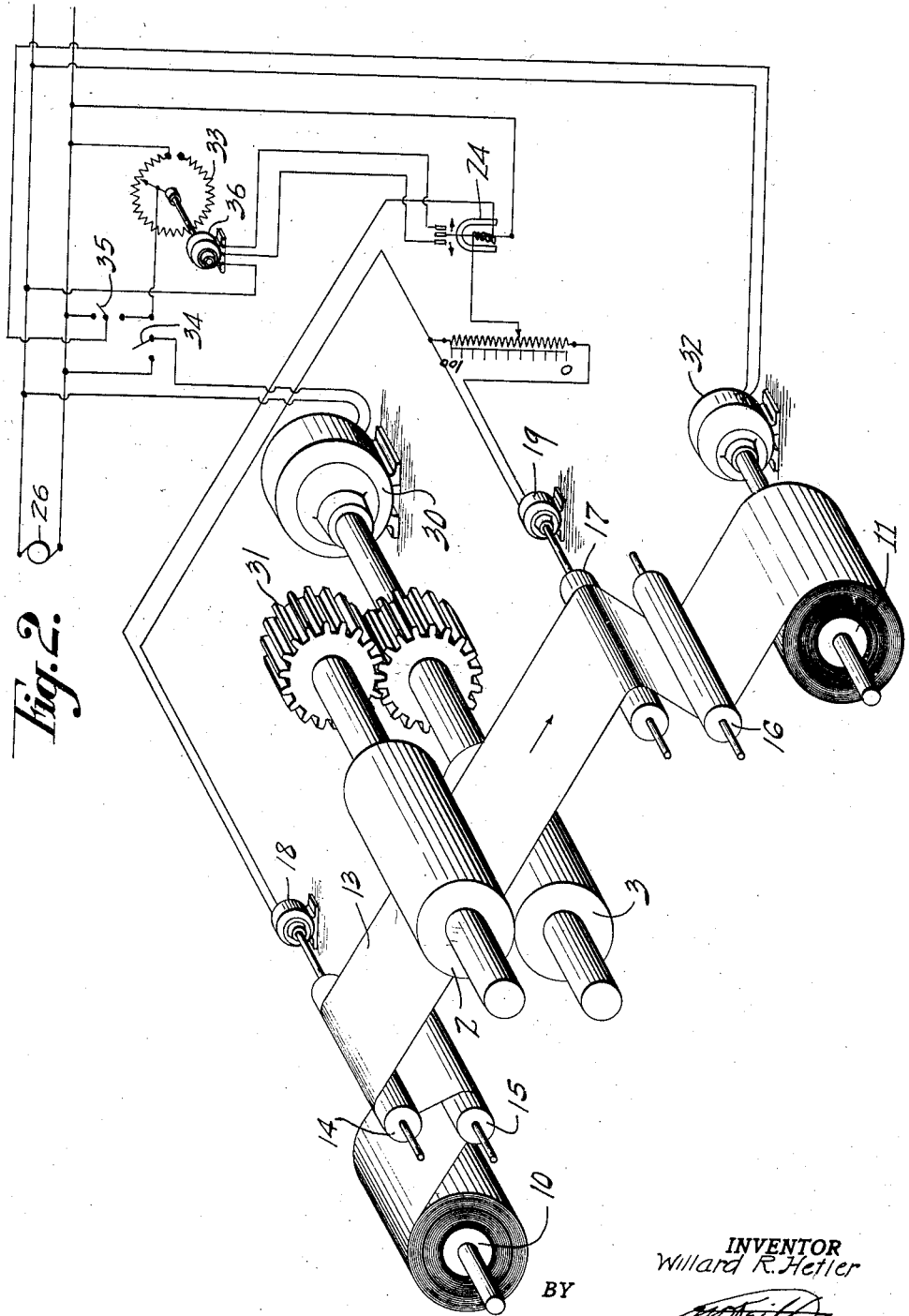
Fig. 2 shows a schematic rolling mill arrangement and another manner of adapting the invention to the control of gauge.

Previous apparatus for indicating and controlling the gauge of rolled products has been adapted to be actuated by measuring the thickness of the metal leaving the mill rolls. My improved means is adapted to be actuated in accordance with the difference in the lineal speed of the metal entering the mill and the metal leaving the mill, and is based on the fact that in the rolling of comparatively thin gauge metal the elongation of the metal in a direction parallel to the roll axis is negligible and therefore the percentage increase of exit speed over entry speed is a direct measure of the percentage gauge reduction.

The previous means referred to are suitable and preferred for mills used for breaking down the metal stock until uniformity of gauge is secured in the material, as the accuracy of my novel control means is largely dependent on the uniformity of gauge of the metal when brought into the mill with which the improved control means is adapted to be used. However, such devices as are actuated by the thickness of the metal being rolled are comparatively expensive and their use is sometimes unwarranted because of the high cost. Many of them are totally unsuited for use on thin gauge material, particularly softer materials such as aluminum, tin and the like, as they tend to mark the material when used in the preferred form, and the devices which are suitable for use with such thin and soft materials are much too complicated and delicate for general use.

It is known in the art of rolling metals that non-uniformity of gauge is more easily corrected in the earlier roll passes in what is generally designated as a break-down mill. Therefore, the product coming from the break-down mills is usually as uniform as can be obtained. Breakdown mills can be equipped with the previous type of control and gauge referred to, and the broken down product is then taken to the finishing mills on which my particular type of apparatus is to be used. One break-down mill is usually sufficient to keep several of the so-called finishing mills supplied with materials.

My improved device consists essentially of two electrical generators of known characteristics, one of which is mounted to be driven by, or proportionally to the speed of, the metal entering the mill and the other of which is mounted to be driven by, or proportionally to the speed of, the metal leaving the mill. The generators are connected in such a manner that the electromotive forces produced are opposed through suitable indicating apparatus so that the difference in the electromotive forces produced is a direct function of the difference in lineal speed and therefore of the percentage reduction.

Referring to the drawings, and particularly to Fig. 1, a housing 1 is adapted to support a pair of working rolls 2 and 3 mounted to rotate in suitable bearings in the directions indicated by the arrows when driven by a suitable source of power, not shown. The clearance between the rolls is varied by rotation of the screw 4 which is adapted to raise and lower the top roll in the housing, suitable gears for providing such motion being mounted in the casing 5. A reversing motor 6 adapted to actuate the screw-down mechanism drives said mechanism through a train of gears or other suitable power-transmitting means. For convenience of illustration the motor 6 is described as a split field motor, though it is obvious that any type of reversing motor can be conveniently substituted therefor. A split field motor is a motor provided with two separate sets of field windings wound in opposite directions, each adapted to operate the motor in one direction, the direction of rotation being determined by the particular field excited. The two sets of field windings are provided with individual taps 7 and 8, and with a common tap 9.

Mounted on each side of the rolling mill are coiling blocks or drums 10 and 11 suitable for supporting the coiled metal strip. The drum 10 is capable of rotation about the shaft 12 and delivers the metal strip 13 to the rolls. For convenience hereinafter this drum, together with its supporting mechanism, will be referred to as the unwind stand, and the drum 11, together with its supporting mechanism, as the rewind stand. The rewind stand is adapted to coil the strip as it is delivered from the mill and is usually connected for rotation to a separate power source, not shown, although it may be driven through suitable power-transmitting devices by the mill drive motor. To secure uniform movement of the metal to and from the working rolls and to compensate for differences in coil diameter, it is customary to provide bridle rolls 14, 15, 16 and 17 positioned approximately as shown, through which the strip is threaded. The bridle rolls 14, 15, 16 and 17 are mounted in suitable bearings and are rotated by the movement of the strip at a speed directly proportional to its lineal speed.

Mounted one on each side of the working rolls are two electrical generators or magnetos 18 and 19, also adapted to be driven at a speed directly proportional to the lineal speed of the strip, as by connecting the shafts of said generators to the shafts of the bridle rolls 14 and 17. Preferably these generators should have identical electrical characteristics, though it is not essential that they be identical, for if their individual characteristics are known, suitable corrections can be made by any one skilled in the art.

The generators are connected in such manner that the E. M. F. produced by the generator 18 which is driven by the movement of the entering strip is opposed by the E. M. F. produced by the generator 19 which is driven by movement of the strip leaving the rolls. If the electrical characteristics of the generators are identical and the driving speeds are identical, a galvanometer in the circuit between the generators will read zero. However, if the material going through the mill is being reduced in gauge, generator 19 will have its speed and therefore its electrical output increased above that of generator 18 by a percentage equal to the percentage of gauge reduction.

In the form illustrated, the negative terminals of generators 18 and 19 are connected together by a suitable conductor 20. The positive terminal of generator 19 is connected by a conductor 21 to one end of the resistance element of a slide-wire rheostat 22, and the other end of the resistance is connected to the conductor 20, completing the circuit. The slide-wire rheostat with respect to the E. M. F. produced by generator 19 is a fixed resistance and is provided with suitable taps along its length. Preferably the resistance divisions formed by these taps are equal and are graduated as shown, for purposes which will be apparent later.

The positive terminal of generator 18 is connected by means of conductor 23 through the actuating means of a constant current relay 24 to the slide of the rheostat 22. It can be seen that if the slide is on the tap corresponding to 0 on the scale, the electromotive forces of generators 18 and 19 are opposed, and if the speeds are equal there will be no current flow through the relay 24. However, if the metal going through the mill is being reduced in gauge, due to the elongation of the metal, generator 19 will be driven at a higher speed than generator 18. To obtain zero current through the relay 24 it will be necessary to reduce the amount of resistance in the circuit of generator 18, as by moving the slide of the rheostat from the 0 graduation toward the 100 graduation an amount equal to the percentage reduction in gauge.

Any deviation from the correct reduction will cause a current flow through relay 24 in one direction or the other, depending on whether the reduction is excessive or insufficient as compared with the per cent reduction desired and as previously set on the rheostat. A current flow through relay 24 is adapted to actuate the pivoted contacter 25, which is connected to one side of an energy source, such as generator 26, in one direction or the other, dependent on the direction of the current flow. Such movement will bring contacter 25 in engagement with either contact 27 or 28, energizing one of the fields of the split field motor 6, thus raising or lowering the screw 4 in the proper manner to correct the amount of reduction to that desired. As soon as the desired reduction is again effected, the relay will open and remain open until variation in reduction again closes it.

While the above description is concerned with the control of gauge by means of a screw-down, in some cases, particularly in rolling extremely thin material such as foil, it is preferable to control the gauge by means of other variables or combinations of variables. For example, in the rolling of foil the reduction can be controlled within certain limits by increasing or decreasing the rolling speed, an increase in speed tending to increase the amount of reduction and a decrease in speed to decrease the reduction. Another manner in which the reduction can be controlled is by putting the metal in a state of tension as it leaves the mill. This is usually accomplished by having the rewind driving means tend to run at a higher speed than the delivery speed. If the tension on the material is increased the percentage of reduction is increased, and if the tension is decreased within certain limits the percentage of reduction is decreased. Apparatus adapted for the control of these variables is illustrated in Fig. 2, in which is shown a simplified schematic arrangement for a mill similar to that illustrated in Fig. 1.

In Fig. 2 the working rolls are shown adapted to be driven by a variable speed motor 30 through a suitable gear train 31. The rewind drum 11 is shown adapted to be driven by a variable speed motor 32. A motor-driven rheostat 33 suitable for controlling the motor speed is adapted to be put in either the mill drive motor circuit or in the rewind motor circuit. When the control is to be used to vary the mill speed in accordance with fluctuations in reduction, switch 34 is thrown to the right (switch 35 being in engagement with its upper contact), placing rheostat 33 in the mill drive motor circuit which is adapted to be energized by the energy source 26, the rewind motor being across the conductors leading to the generator 26. When it is desired to control the reduction by increasing or decreasing the tension, switches 34 and 35 are closed in the opposite directions to those above described.

The control apparatus, exactly as previously described, is adapted to actuate the relay 24 which in this example controls the direction of rotation of the split field motor 36 which drives the rheostat 33 to increase or decrease the amount of resistance in the mill motor circuit or in the rewind motor circuit, depending on the method of control being used. This variation in resistance serves to increase or decrease the speeds of the motors of the respective circuits in which the resistance is operative.

It is often desirable to have an indication of the amount of deviation in reduction of the metal being rolled, and such indication can be obtained by the insertion of suitable meters in the circuit including the generators, or the automatic control feature can be eliminated by substituting a galvanometer in place of the relay, and, based on the galvanometer reading, suitable corrections can be effected manually to compensate for variations in reduction. The galvanometer selected for this purpose should be capable of reading positive and negative values. It is also apparent that fixed resistances can be substituted for the variable resistance in the two generator circuits, and such resistances may be calibrated to give certain percentages of reduction.

A highly accurate and convenient arrangement for determining deviation in reduction is illustrated schematically in Fig. 3. A generator 40 adapted to be driven at a speed proportional to the speed of the metal entering the rolling mill, as previously illustrated, is in a closed circuit including a small variable resistance 41 and a resistance 42 preferably provided with taps 43 which divide the resistance into an equal number of parts. The rewind generator 44 is in a closed circuit with a resistance 45 identical with resistance 42 except that the taps may be omitted. In the same circuit is a suitable graduated slide-wire resistance 46 connected as shown. Preferably the total resistance of the slide-wire should be equal to or greater than the resistance between any two adjacent taps on resistance 42. Connected between the slide of the slide-wire and one of the taps on resistance 42 is a galvanometer 47 capable of reading positive and negative values. The variable resistance 41 provides an adjustment for giving a zero setting for the generator tap at zero gauge reduction. By moving the slide of the slide-wire and selecting the proper resistance tap, any desired percentage reduction of gauge may be set. Any deviation from this set reduction will be indicated by the movement of the galvanometer indicator, and proper adjustment may be made in the mill to compensate for said deviation.

The accuracy of control obtained by the above described apparatus is dependent largely on the sensitivity of the apparatus employed and on the uniformity of gauge of the material entering the mill. It can be seen that any lack of uniformity of the entering material is reflected in the product leaving the mill due to the inherent characteristics of this type of control. However, if the entering material is uniform in gauge, a highly accurate control is obtained by utilization of this means. The control is highly economical because such adjustments as must be made are instantly indicated and can be corrected without stopping the mill.

In the above description the generators have been shown connected directly to a bridle roll of a mill. However, it is apparent that any method of driving the generators may be used provided that one generator is driven at a speed proportional to the lineal speed of the metal entering the mill and the other driven at a speed proportional to the lineal speed of the metal leaving the mill. It is also apparent that modifications may be made in the methods of control and in the various circuits employed. It is understood, however, that the specific forms described are merely illustrative of my invention, and that many modifications may be made in the construction and application of the invention within the scope of the appended claims.

I claim:

1. In a rolling mill, the combination of an electrical generator driven by the material entering the mill, an electrical generator driven by the material leaving the mill, each of said generators having their electrical outputs opposed through resistances proportional to the percentage gauge reduction desired, and means for indicating deviation from the desired reduction.

2. In a rolling mill, the combination of an electrical generator driven at a speed proportional to the speed of the material entering the mill, a second electrical generator driven at a speed proportional to the speed of the material leaving the mill, both of said generators being in a circuit in which their respective electromotive forces are opposed, and means in said circuit for balancing said electromotive forces when the designed gauge reduction is effected by the mill.

3. In a rolling mill, the combination of an electrical generator driven at a speed proportional to the speed of the material entering the mill, a second electrical generator driven at a speed proportional to the speed of the material leaving the mill, both of said generators being in a circuit in which their respective electromotive forces are opposed, means in said circuit for balancing said electromotive forces when the desired reduction is effected by the mill, and means for indicating deviation from the desired reduction.

4. In a rolling mill, the combination of an electrical generator driven by the material entering the mill, a second generator driven by the material leaving the mill, both of said generators being in a circuit in which their respective electromotive forces are opposed, and means in said circuit for balancing said electromotive forces when the desired gauge reduction is effected by the mill.

5. In a rolling mill, the combination of an electrical generator driven by the material entering the mill, a second electrical generator driven by the material leaving the mill, both of said generators being in a circuit in which their respective electromotive forces are opposed, means in said circuit for balancing said electromotive forces when the desired reduction is effected by the mill and means for indicating deviation from the desired reduction.

6. In a rolling mill, the combination of an electrical generator driven at a speed proportional to the speed of the material entering the mill, a second electrical generator driven at a speed proportional to the speed of the material leaving the mill, both of said generators being in a common circuit, said circuit including a resistance and indicating means, said resistance being fixed with respect to said second generator and variable with respect to the first-mentioned generator and having an amount of resistance effective on the first-mentioned generator output less than the amount effective on said second generator output by an amount equal in per cent to the per cent gauge reduction of the material being rolled, and said indicating means being adapted to indicate deviation in said reduction.

7. In a rolling mill, the combination of an electrical generator driven at a speed proportional to the speed of the material entering the mill, an electrical generator driven at a speed proportional to the speed of the material leaving the mill, said generators being in a circuit in which their respective electromotive forces are adapted to be opposed, resistances in said circuit effective on the respective generator outputs to an extent directly proportional to the differences in speeds of the generators at a desired gauge reduction.

8. In a rolling mill, the combination of an electrical generator driven at a speed proportional to the speed of the material entering the mill, a second electrical generator driven at a speed proportional to the speed of the material leaving the mill, said generators being connected in a circuit in which their respective outputs are opposed through suitable conductors, resistances connected across said conductors and adapted to divide the current from each generator, at least one of said resistances being adjustable to compensate for differences in the generator outputs at a desired gauge reduction to effect zero current flow in a portion of the circuit, and means in said portion of the circuit for indicating current flow.

9. In a rolling mill, the combination of an electrical generator driven at a speed proportional to the speed of the material entering the mill, a second electrical generator driven at a speed proportional to the speed of the material leaving the mill, said generators being in a circuit adapted to oppose their respective electromotive forces, resistances in said circuit effective on the respective generator outputs to an extent directly proportional to the differences in speed of the generators at a desired gauge reduction, and means actuated by deviation from said desired gauge reduction to correct said deviation.

10. In a rolling mill, the combination of an electrical generator driven at a speed proportional to the speed of the material entering the mill, a second electrical generator driven at a speed proportional to the speed of the material leaving the mill, said generators being in a circuit adapted to oppose their respective electromotive forces, resistances in said circuit effective on the respective generator outputs to an extent directly proportional to the differences in the speed of the generators at a desired gauge reduction, means for correcting deviation from the desired gauge reduction and means actuated by said deviation for actuating said last-mentioned means.

11. In a rolling mill, the combination of an electrical generator driven at a speed proportional to the speed of the material entering the mill, a second electrical generator driven at a speed proportional to the speed of the material leaving the mill, both of said generators being in a circuit in which their respective electromotive forces are opposed, means in said circuit for balancing said electromotive forces when the desired gauge reduction is effected by the mill, and means for correcting deviation from said desired gauge reduction.

12. In a rolling mill, the combination of a screw-down, means for actuating said screw-down to increase or decrease the pressure on material being rolled, an electrical generator driven at a speed proportional to the speed of the material entering the mill, a second electrical generator driven at a speed proportional to the speed of the material leaving the mill, a circuit in which the respective electromotive forces of said generators are opposed, means in said circuit for balancing said electromotive forces when the desired gauge reduction is effected by the mill, and means for correcting deviation from said desired gauge reduction comprising a relay on said circuit adapted to be actuated by the current flow therethrough during an unbalanced condition of said circuit to energize said screw-down actuating means.

13. In a rolling mill in combination, means for rewinding material under tension as it is delivered from the mill, means for increasing or decreasing the tension on said material, an electrical generator driven at a speed proportional to the speed of the material entering the mill, a second electrical generator driven at a speed proportional to the speed of the material leaving the mill, a circuit in which the respective electromotive forces of said generators are opposed, means in said circuit for balancing said electromotive forces when the desired gauge reduction is effected by the mill, and means for correcting deviation from said desired gauge reduction comprising a relay on said circuit adapted to be actuated by the current flow therethrough during an unbalanced condition of said circuit to actuate said tension-varying means.

14. In a rolling mill in combination, means for driving the mill rolls, means for increasing or decreasing the speed of said driving means, an electrical generator driven at a speed proportional to the speed of the material entering the mill, a second electrical generator driven at a speed proportional to the speed of the material leaving the mill, a circuit in which the respective electromotive forces of said generators are opposed, means in said circuit for balancing said electromotive forces when the desired gauge reduction is effected by the mill, and means for correcting deviation from said desired gauge reduction comprising a relay on said circuit adapted to be actuated by the current flow therethrough during an unbalanced condition of said circuit to actuate said roll-speed-varying means.

WILLARD R. HETLER.